United States Patent [19]

Ault

[11] 3,900,820

[45] Aug. 19, 1975

[54] LINE SUPERVISORY CIRCUIT

[75] Inventor: Cyrus Frank Ault, Wheaton, Ill.

[73] Assignee: Bell Telephone Laboratories, Incorporated, Murray Hill, N.J.

[22] Filed: Feb. 25, 1974

[21] Appl. No.: 445,060

[52] U.S. Cl. ...................... 335/52; 335/58; 200/209

[51] Int. Cl. ........................................... H01h 29/00

[58] Field of Search .................. 335/49, 51, 52, 58; 200/209, 214

[56] References Cited

UNITED STATES PATENTS

| | | | |
|---|---|---|---|
| 3,278,713 | 10/1966 | Grupen | 335/49 X |
| 3,492,532 | 1/1970 | Fayling | 335/56 X |
| 3,646,490 | 2/1972 | Bitko | 335/58 |
| 3,673,524 | 6/1972 | Lowry | 335/52 |
| 3,699,485 | 10/1972 | Lindenmeyer | 335/49 |

*Primary Examiner*—G. Harris

*Attorney, Agent, or Firm*—J. C. Albrecht

[57] ABSTRACT

A line supervisory circuit for determining the on-hook or off-hook status of a subscriber line subset responsive to current in the subscriber line. The line supervisory circuit includes a container having two magnetic armatures within it which are free to move in a longitudinal axis. Each magnetic armature has a drive winding which is inductively coupled to it and can force it to move in either direction depending upon the direction of the current in the drive winding. If the magnetic armatures are forced together as a result of the current in the drive windings then a globule of mercury centered between the two magnetic armatures will be distorted so that it will establish a conductive path between two terminals.

6 Claims, 1 Drawing Figure

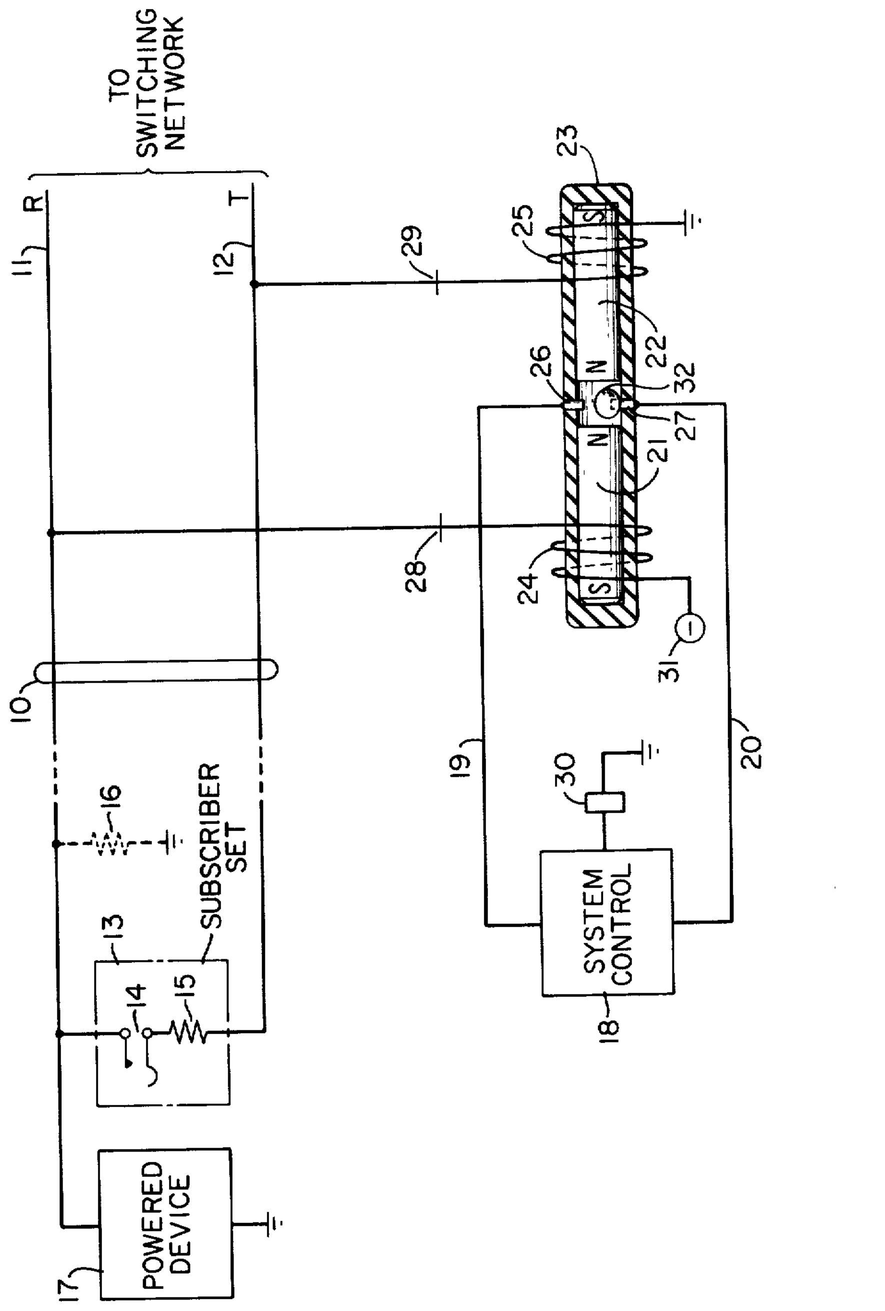
TO SWITCHING NETWORK
R
T
11
12
10
13
14
15
16
17
SUBSCRIBER SET
POWERED DEVICE
SYSTEM CONTROL
18
19
20
21
22
23
24
25
26
27
28
29
30
31
32
S
N
N
S

LINE SUPERVISORY CIRCUIT

BACKGROUND OF THE INVENTION

This invention relates to telephone switching systems and particularly to subscriber line supervisory circuits.

Line supervisory circuits are used in connection with a telephone central office to monitor the operative state of associated subscriber sets. One type of line supervisory circuit is used to detect the hookswitch conditions of a subscriber set. When the subscriber set goes off-hook, the resistance of the set is connected across the line by means of the hookswitch. This resistance completes a circuit in connection with the office battery which is applied to the line and results in current in the subscriber line. A line supervisory circuit makes use of this off-hook current to detect the off-hook condition. One well known prior art line supervisory circuit, for example, is the "ferrod" scanner described in *The Bell System Technical Journal* Vol. 43, September 1964, at pages 2257 et seq. The present invention represents a departure from the prior art as there exemplified for performing similar functions in a new and novel manner.

Line supervisory circuits are constructed to respond to current which flows through one drive winding, through the subscriber set and back through the other drive winding to the central office. There are, however, certain cases where current may be present in one drive winding but not in the other. One such case would be line leakage which in one instance can be thought of as a characteristic lumped resistance from the line to ground, most often due to lines being wet. Another example would be devices requiring power at the subscriber premises such as a lamp associated with the subscriber set. If current due to such sources is of sufficient magnitude, for example, during floods when the lines are extremely wet, it may cause a false off-hook indication which could result in a complete loss of service. This problem also tends to discourage the use of auxiliary equipment associated with the subscriber set, which equipment might require power and, in many cases, would presently impose the burden of providing an independent power source.

It is accordingly an object of this invention to render ineffective externally generated spurious currents in a telephone subscriber line supervisory circuit.

SUMMARY OF THE INVENTION

In one illustrative embodiment of this invention a line supervisory circuit includes an operative switch comprising a magnetic arrangement comprising an elongated container having one drive winding wound around one end in series between the ring conductor and the central office battery and another drive winding wound around the other end in series between the tip conductor of the subscriber line and ground. The ring and tip drive windings are inductively coupled to respective magnetic armatures slidably inserted within the container. Centered between the magnetic armatures within the container is a globule of mercury which normally is amalgamated to one of two terminals. The magnetic armatures are constructed of permanent magnetic material and oriented with like poles facing each other so that with no current present in either drive winding the magnetic armatures will repel each other and will not physically contact the mercury globule. The drive windings are wound in such a way and the magnetic armatures oriented in such a way that when the subscriber set goes into an off-hook state, the resulting current from the central office battery through the ring drive winding, the subscriber set, the tip drive winding and then to ground will cause the two magnetic armatures to be forced together which will distort the mercury globule sufficiently to contact both terminals thereby establishing a conducting path between them. This conducting path provides an interrogate means for indicating the hookswitch condition to the system control which is connected to the two terminals. Any other combination of currents in the two drive windings will either cause the magnetic armatures to further repel each other or to translate in the same direction with the result that neither of these movements will cause the mercury globule to establish contact between the two terminals. This circuit thus advantageously has the desired effect of preventing false off-hook indications due to spurious currents.

BRIEF DESCRIPTION OF THE DRAWING

The organization and operation of a line supervisory circuit according to this invention will be better understood from a consideration of the detailed description of the organization and operation of one illustrative embodiment thereof which follows when taken in conjunction with the accompanying drawing, the single FIGURE of which depicts an exemplary line supervisory circuit connected between a subscriber line and the central office battery of a typical telephone central office.

DETAILED DESCRIPTION

One illustrative line supervisory circuit according to this invention is shown in the drawing as being connected across the ring and tip conductors 11 and 12 of a typical telephone subscriber line 10 at the central office. Only a representative portion of a subscriber line is shown and it will be appreciated that the line is extended to the switching network of the telephone system. The subscriber end of the line 10 is connected to a standard subscriber set 13, represented in the drawing only to the extent of showing its normally open hookswitch contacts 14 in series with a resistance 15 which resistance represents the characteristic resistance of the subscriber set when it is in its off-hook state. A line leakage resistance 16 is shown in a dash-line connection between the ring lead 11 and ground as being representative of the lumped resistance between that lead and ground. Typically, the line leakage resistance 16 is very high; however, in cases where the subscriber line becomes wet as during a flood or heavy rain, the resistance can become low enough to draw an appreciable amount of current. A powered device 17 is represented as connected to the ring lead 11 at the subscriber premises and may comprise any device associated with the subscriber set which it is desired to power from the central office. One such powered device would be, for example, a lamp for lighting a dial of the subscriber set.

The line supervisory circuit comprises a magnetic switch arrangement comprising a hollow elongated container 23 having, in this embodiment, a substantially circular cross section. Container 23 has a drive winding 24 wound around one of its ends and connected in series between the central office battery 31 and the ring lead 11 via a break contact 28 of a cut-off relay 30. Another drive winding 25 is wound around the other end of container 23 and is connected in series between the tip lead 12 and ground via a break contact 29 of cut-off relay 30. A first magnetic armature 21 is slidably positioned within one end of container 23 and winding 24 coupled thereto. A second magnetic armature 22 is also slidably positioned within an end of container 23 and has winding 25 inductively coupled thereto. The armatures 21 and 22 are positioned in a spaced-apart relationship with like poles facing each other. Two terminals 26 and 27 are located midway between armatures 21 and 22 in an axis transverse to the axes of the armatures. The container 23 is oriented so that terminal 27 is located on the bottom and terminal 26 on the top of container 23 as viewed in the drawing. Terminal 27 is constructed of a size and shape such that it acts as a stop to prevent the movement of either magnetic armature 21 or 22 beyond it. A globule of mercury 32 is positioned between the magnetic armatures 21 and 22 and terminals 26 and 27. Terminal 27 is constructed of such a material that the globule of mercury 32 which is placed upon it will amalgamate to it and therefore remain centered. The sizes and shapes of the mercury globule 32 and the terminal 27 are such that if both magnetic armatures are forced to move as close together as terminal 27 will allow then the mercury globule 32 will distort into a shape which will contact both terminals 26 and 27 resulting in the establishment of an electrically conductive path between them. Each armature acts as a backup for the other one so that their cooperative effect achieves contact between terminals 26 and 27 through globule 32.

The system control 18 of the telephone system is shown only in block symbol form and need not be considered for a complete understanding of this invention beyond describing the control functions performed thereby and the signals received. The line supervisory circuit is extended to system control 18 by means of conductors 19 and 20 which are attached to terminals 26 and 27, respectively. When the line supervisory circuit detects the off-hook condition of the subscriber subset 13, an electrically conductive path is established between terminals 26 and 27 for interrogate signals from system control.

With the circuit of this invention connected as described, an illustrative operation may now be considered. The cut-off relay 30 is assumed to be not operated, i.e., both contacts 28 and 29 are closed. Once an off-hook state of the subscriber set has been detected the relay 30 will be operated by the system control 18, opening contacts 28 and 29; however, since the present invention is concerned with the detection of the off-hook state, only the not operated condition of the relay 30 need be considered. The relay 30 and its contacts are only shown to provide an operational context for the present invention.

Each of the drive windings 24 and 25 can be in one of three possible states with respect to the current present therein. The first state is no current present, the second, current present in a winding in the direction of normal current flow from the central office battery 31 to ground with the windings 24 and 25 connected according to FIG. 1 and, finally, the third state is the opposite direction of current in a winding. Since spurious currents can occur from a number of sources and may occur in only one or the other of the two drive windings, all nine possible combinations of current in the two drive windings 24 and 25 will be considered. The following table shows all nine combinations along with the resulting state of the conductive path between contacts 26 and 27 and a statement of the condition of the two magnetic armatures 21 and 22.

| State | Ring $i$ | Tip $i$ | Contact | Condition of Armatures |
|---|---|---|---|---|
| 1 | 0 | 0 | 0 | Repulsed by permanent magnetism |
| 2 | + | + | 1 | Forced together by current |
| 3 | − | − | 0 | Repulsed by current |
| 4 | + | − | 0 | Translate right |
| 5 | + | 0 | 0 | Translate right |
| 6 | 0 | − | 0 | Translate right |
| 7 | − | + | 0 | Translate left |
| 8 | − | 0 | 0 | Translate left |
| 9 | 0 | + | 0 | Translate left |

$i = 0$ no current
$i = +$ current in direction from C.O. battery to ground
$i = -$ current in opposite direction
contact = 0 open
contact = 1 closed The following description of the operation of the line supervisory circuit will first consider the normal states which result from the on-hook and off-hook condition of the subscriber set and will then consider the other states due to spurious currents.

If the subscriber set 13 is in an on-hook condition, contacts 14 are open and no current is being drawn by either the line leakage resistance 16 or the powered device 17, then no current will be present in either drive winding 24 or 25 and no magnetic field will be created by them. With no magnetic field due to the drive windings, the permanent magnetic armatures with like poles facing will repel each other and the mercury globule 32 will be centered on terminal 27 in its normal spheroid shape out of contact with terminal 26. With the circuit in this state, if the system control 18 interrogates the contact between conductors 19 and 20, it will detect an open circuit which represents the on-hook condition of the subscriber set 13.

If the subscriber set 13 is in an off-hook state, i.e., having contacts 14 closed, then the characteristic resistance 15 of the subscriber set will be connected across the subscriber line 10 and will complete a circuit resulting in current in the line from the office battery 31. This current will pass through both the ring drive winding 24 and the tip drive winding 25 in the direction defined as positive in the foregoing table such that both magnetic armatures 21 and 22 will be forced toward the center until they are stopped by stop terminal 27. With the magnetic armatures forced together in this manner the globule of mercury 32 will be distorted into contact with terminal 26 as well as terminal 27 resulting in an electrically conductive path between the two terminals. With the line supervisory circuit in this state, if the system control 18 interrogates the condition of the contact between line 19 and 20, it will detect a conductive path which is interpreted as an off-hook condition at the subscriber set 13. It will be noted by an examination of the state of the table above that this is the only possible combination of current states in the two drive windings 24 and 25 which will result in an off-hook indication. The beneficial characteristic of this invention, namely, not creating a false off-hook indication for any of the spurious current combinations, can be clearly seen from the foregoing description. However, the operation of the invention will be further described by considering representative cases of spurious current.

When the subscriber set 13 is on-hook and at the same time an appreciable amount of current is drawn either by the line leakage resistance 16 or a powered device 17, then there will be current in the ring drive winding 24 in a positive direction but not in the tip drive winding 25. The current in the ring drive winding 24 will force the magnetic armature 21 toward the center of the container until it is stopped by terminal 27. The movement of the magnetic armature 21 toward the center will further repel magnetic armature 22 beyond its normal position when in state one of the table. The mercury globule 32 will be pushed to one side by the magnetic armature 21. However, since there is now an open space for it to move laterally, it will not be distorted vertically sufficiently to create a contact between terminals 27 and 26. As a result, the system control 18 during an interrogation will correctly interpret this state of the subscriber equipment as being the on-hook condition despite the spurious current in ring conductor 11.

The above consideration of state five of the table can be easily extended to understand states four, seven and eight. State four has the same current in the ring drive winding 24 with a current in the tip drive winding 25 which forces magnetic armature 22 away from the center of container 23 and simply increases the effect described above with the same result. States seven and eight are symmetric to states four and five resulting in a translation fo the magnetic armatures 21 and 22 in the opposite direction but with the same resulting condition of the mercury globule 32 with respect to terminal 26.

States three, six and nine of the table result in forcing one or both of the magnetic armatures 21 and 22 away from the center of container 23 again resulting in no effect upon the mercury globule 32. As a result the circuit including lines 19 and 20 remains open.

What has been described is considered to be only a specific illustrative embodiment of the invention and it is to be understood that various other arrangements may be devised by one skilled in the art without departing from the spirit and scope thereof as defined by the accompanying claims.

What is claimed is:

1. An electrical switch device comprising a magnetic armature movably mounted in its longitudinal axis, a first and a second spaced-apart terminal between said armature and a backup means along a second axis transverse to said longitudinal axis, means for completing an electrical circuit between said terminals comprising a pliant, electrically conductive globule positioned between said armature and said backup means in said first axis and between said terminals in said second axis, and means for moving said armature against said globule to distort said last-mentioned globule into contact with said terminals comprising an energizable winding coupled to said magnetic armature.

2. An electrical switch device as claimed in claim 1 in which said backup means comprises a second magnetic armature movably mounted in said longitudinal axis and a second energizable winding coupled to said second magnetic armature.

3. An electrical switch device comprising a first and a second magnetic armature movably mounted in a common longitudinal axis in a spaced-apart relationship, a first and a second spaced-apart terminal between said armatures along a second axis transverse to said longitudinal axis, means for completing an electrical circuit between said terminals comprising a pliant, electrically conductive globule positioned between said armatures and said terminals, and means for moving said armatures against said globule to distort said last-mentioned globule into contact with said terminals comprising a first and a second energizable winding coupled respectively to said first magnetic armature and said second magnetic armature.

4. An electrical circuit for monitoring the operative state of a telephone subscriber set comprising a first and a second magnetic armature movably mounted in a common longitudinal axis in a spaced-apart relationship, a first and a second spaced-apart terminal between said armatures along a second axis transverse to said longitudinal axis, means for completing an electrical circuit between said terminals comprising a pliant, electrically conductive globule positioned between said armatures and said terminals, and means for moving said armatures against said globule to distort said last-mentioned globule into contact with said terminals comprising a first and a second energizable winding coupled respectively to said first magnetic armature and said second magnetic armature, said first winding in series between the ring lead of a subscriber line and the central office battery and said second winding in series between the tip lead of said subscriber line and ground.

5. An electrical device as claimed in claim 1 in which said armature, said terminals, and said globule are enclosed in an elongated container.

6. An electrical switch device as claimed in claim 1 in which said globule comprises mercury.

* * * * *